United States Patent
Ramesh et al.

(10) Patent No.: US 11,343,032 B2
(45) Date of Patent: May 24, 2022

(54) FREQUENCY SPREADING FOR HIGH-PERFORMANCE COMMUNICATIONS

(71) Applicant: MaxLInear, Inc., Carlsbad, CA (US)

(72) Inventors: Sridhar Ramesh, Carlsbad, CA (US); Curtis Ling, Carlsbad, CA (US); Xing Tan, Vista, CA (US)

(73) Assignee: MaxLinear, Inc., Carlsbad, CA (US)

(*) Notice: Subject to any disclaimer, the term of this patent is extended or adjusted under 35 U.S.C. 154(b) by 493 days.

(21) Appl. No.: 14/157,090

(22) Filed: Jan. 16, 2014

(65) Prior Publication Data

US 2014/0198828 A1 Jul. 17, 2014

Related U.S. Application Data

(60) Provisional application No. 61/753,206, filed on Jan. 16, 2013.

(51) Int. Cl.
*H04L 5/00* (2006.01)

(52) U.S. Cl.
CPC .................. *H04L 5/003* (2013.01)

(58) Field of Classification Search
CPC ............... H04L 5/0007; H04L 27/2647; H04L 2025/03414; H04L 5/003; H04B 7/0639
USPC .................................................. 375/260, 130
See application file for complete search history.

(56) References Cited

U.S. PATENT DOCUMENTS

| | | | |
|---|---|---|---|
| 2003/0099304 A1* | 5/2003 | Gore .................... | H04B 7/0615 375/267 |
| 2005/0281226 A1* | 12/2005 | Lee .................. | H04W 72/0413 370/329 |
| 2007/0202816 A1* | 8/2007 | Zheng .................. | H04L 5/0037 455/91 |
| 2008/0037675 A1* | 2/2008 | Lin ...................... | H04B 7/0417 375/262 |
| 2009/0110114 A1* | 4/2009 | Onggosanusi ....... | H04B 7/0417 375/299 |
| 2010/0080312 A1* | 4/2010 | Moffatt ............... | H04L 27/2618 375/260 |
| 2010/0177723 A1* | 7/2010 | Kim ...................... | H04L 5/0048 370/329 |
| 2010/0202493 A1* | 8/2010 | Soliman .................. | H04B 1/69 375/130 |
| 2011/0286467 A1* | 11/2011 | Lowther et al. .............. | 370/401 |
| 2013/0230079 A1* | 9/2013 | Solomon .............. | H04B 7/0413 375/219 |

* cited by examiner

*Primary Examiner* — Sung S Ahn
(74) *Attorney, Agent, or Firm* — Buchalter; Jason W. Croft

(57) ABSTRACT

Methods and systems are provided for using frequency spreading during communications, in particular communications in which multiple carriers (or subcarriers) are used. The frequency spreading may comprise generating a plurality of spreading data vectors based on transmit data, such as by application of a spreading matrix to portions of the transmit data. Each spreading data vector may comprise a plurality of elements, for assignment to the multiple subcarriers. The receive-side device may then apply frequency de-spreading, to obtain the original transmit data. The frequency de-spreading may comprise use of the same spreading matrix on data extracted from received signals, which (the data) may correspond to the plurality of spreading data vectors.

26 Claims, 6 Drawing Sheets

FREQUENCY SPREADING FOR HIGH-PERFORMANCE COMMUNICATIONS

CLAIM OF PRIORITY

This patent application makes reference to, claims priority to and claims benefit from the U.S. Provisional Patent Application No. 61/753,206, filed on Jan. 16, 2013, which is hereby incorporated herein by reference in its entirety.

TECHNICAL FIELD

Aspects of the present application relate to communications. More specifically, certain implementations of the present disclosure relate to methods and systems for frequency spreading for high-performance communications.

BACKGROUND

Existing methods and systems for communications may be overly inefficient, slow, expensive, power hungry and/or inflexible. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for frequency spreading for high-performance communications, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain example implementations may be found in method and system for non-intrusive noise cancellation in electronic devices, particularly in user-supported devices. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
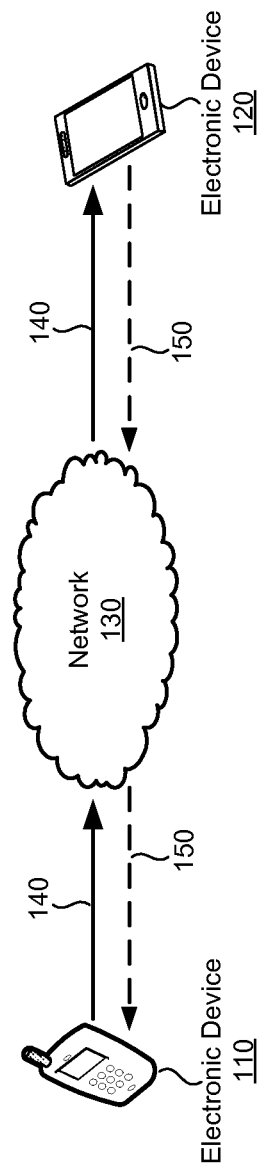
FIG. 1 illustrates an example communication system that may be configured for frequency spreading for high-performance communications.

FIG. 1 illustrates an example communication system that may be configured for frequency spreading for high-performance communications. Referring to FIG. 1, there is shown a communication system 100 comprising electronic devices 110 and 120, a network 130.

The communication system 100 may comprise a plurality of devices (of which the electronic devices 110 and 120 are shown), and communication resources (of which the network 130 is shown) to enable the devices to communicate with one another, such as via the network 130. The communication system 100 is not limited to any particular type of communication media, interfaces, or technologies.

Each of the electronic devices 110 and 120 may comprise suitable circuitry for implementing various aspects of the present disclosure. The electronic devices 110 and/or 120 may be, for example, configurable for performing or supporting various functions, operations, applications, and/or services. The functions, operations, applications, and/or services performed or supported by the electronic devices may be run or controlled based on user instructions and/or pre-configured instructions. In some instances, electronic devices, such as the electronic devices 110 and/or 120, may support communication of data, such as via wired and/or wireless connections, in accordance with one or more supported wireless and/or wired protocols or standards. In some instances, electronic devices, such as the electronic devices 110 and/or 120, may be a mobile and/or handheld device— i.e. intended to be held or otherwise supported by a user during use of the device, thus allowing for use of the device on the move and/or at different locations. In this regard, the electronic devices may be designed and/or configured to allow for ease of movement, such as to allow it to be readily moved while being held by the user as the user moves, and the electronic devices may be configured to perform at least some of the operations, functions, applications and/or services supported by the device on the move. Examples of electronic devices may comprise communication devices (e.g., mobile phones including smartphones, VoIP phones, satellite phones, etc.), handheld personal devices (e.g., tablets or the like), computers (e.g., desktops, laptops, and servers), dedicated media devices (e.g., televisions, audio or media players, cameras, conferencing systems equipment, etc.), and the like. The disclosure, however, is not limited to any particular type of electronic device.

The network 130 may comprise a system of interconnected nodes and/or resources (hardware and/or software), for facilitating exchange and/or forwarding (including, e.g., such functions as routing, switching, and the like) of data among a plurality of devices, and thus a plurality of end users, based on one or more networking standards. Physical connectivity within, and/or to or from the network 130, may be provided using, for example, copper wires, fiber-optic cables, wireless links, and the like. The network 130 may correspond to any suitable landline based phone network, cellular network, satellite network, the Internet, local area network (LAN), wide area network (WAN), or any combination thereof.

In operation, the electronic devices 110 and 120 may communicate with one another within the communication system 100, such as via the network 130. In some instances, communications between the electronic devices 110 and 120 may entail use of multiple carriers (or subcarrier). For example, the electronic devices 110 and 120 may communicate with one another using orthogonal frequency-division multiplexing (OFDM) based interface/protocol. OFDM is used in various wireless and wired networks, and it entail encoding data on multiple carrier (or subcarrier) frequencies. In most OFDM based protocols, each subcarrier may be modulated with conventional modulation scheme (e.g., quadrature amplitude modulation, or QAM). In this regard, each subcarrier may be modulated at low symbol rate, compared with symbol rates used for comparable single carrier schemes, such as to maintain data rate comparable with these comparable single carrier schemes. Nonetheless, the use of OFDM (or other similar multi-subcarrier schemes) may be desirable to provided improved performance, particularly in noisy environments.

In some instances, it may desirable to further enhance performance of multi-carrier schemes, such as to ensure even better performance particularly in noisy conditions. Accordingly, in various implementations of the present disclosure, frequency spreading may be used during communications, particularly when using multiple carriers (or subcarriers). With frequency spreading, input data (e.g., modulation symbols) may be grouped and may then further be processed for spreading the data over the frequencies being used in the communication. In essence, the use of frequency spreading may result in increased frequency diversity and/or improved echo performance. Further, frequency spreading may ensure enhanced power performance (e.g., even power distribution among used frequencies). The frequency spreading may comprise application of particular data manipulation at the transmit-side (e.g., the electronic device 110), resulting in frequency spread transmission over a communication channel (e.g., communication channel 140). At the receive-end (e.g., the electronic device 120), a corresponding manipulation would be necessary to enable extracting the original data from the communication channel 140. The manipulation done at the receive-end may comprise application of frequency de-spreading, which may mirror the frequency spreading done at the transmit-side (i.e., undoing its effects, thus resulting in extracting the original, pre-spreading data). To electronic devices may coordinate the frequency spreading/de-spreading (e.g., when to activate/deactivate it, set the parameters/data used in the frequency spreading/de-spreading, etc.). This can be done by exchanging control messaging, such as using a control channel 150. The control channel 150 may be part of the communication channel 140, or may be a separate channel. Frequency spreading/de-spreading is described in more detail in the following figures.

Figure 2:
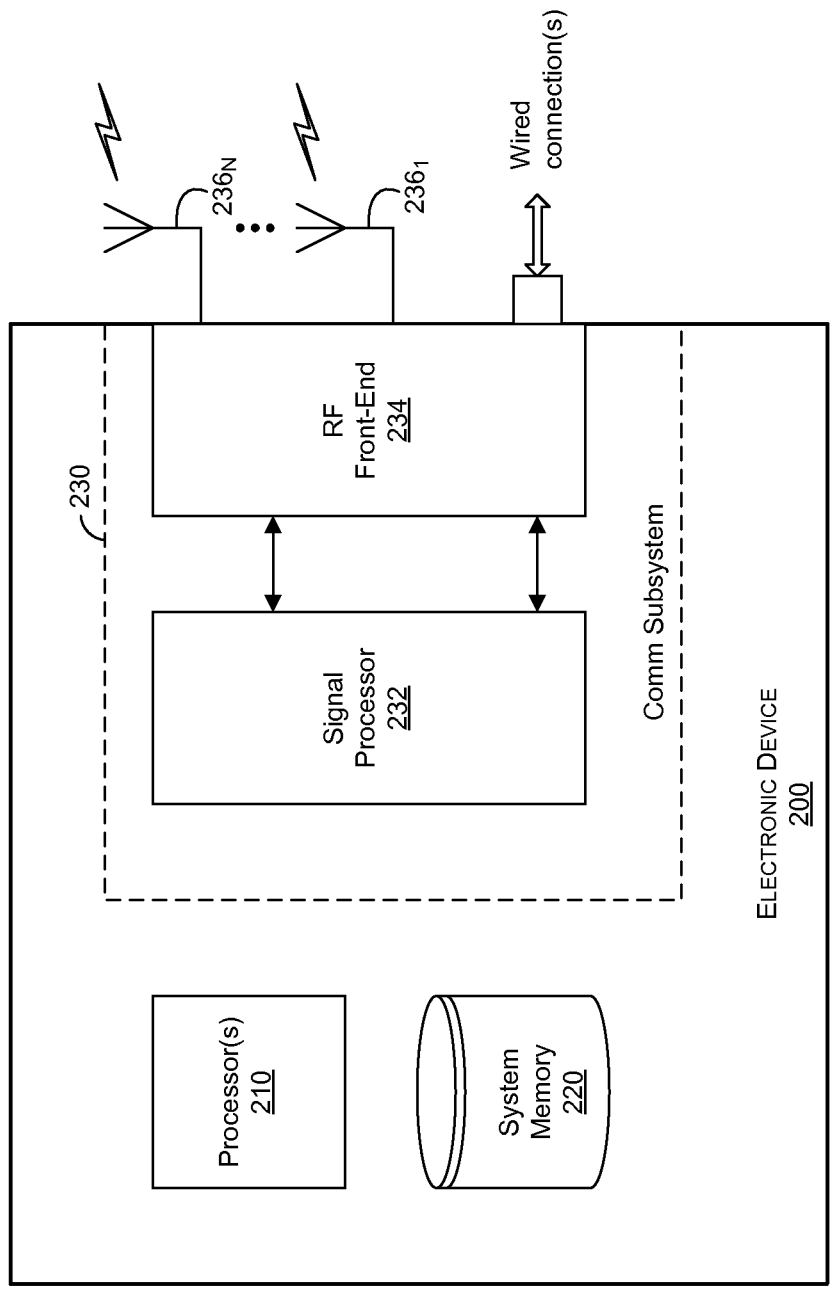
FIG. 2 illustrates an example electronic device that may be used in high-performance communications with frequency spreading.

FIG. 2 illustrates an example electronic device that may be used in high-performance communications with frequency spreading. Referring to FIG. 2, there is shown an electronic device 200.

The electronic device 200 may comprise suitable circuitry for implementing various aspects of the disclosure. The electronic device 200 may correspond to one or both of the electronic devices 110 and 120 of FIG. 1. For example, as shown in the example implementation depicted in FIG. 2, the electronic device 200 may comprise a processor 210, a system memory 220, and a communication subsystem 230.

The processor 210 may comprise suitable circuitry for performing various general and/or specialized processing operations in the electronic device 200. For example, the processor 210 may comprise a general purpose processor (e.g., a central processing unit or CPU). Alternatively, the processor 210 may comprise a special purpose processor, such as a dedicated video/graphics processor, dedicated application processor (e.g., ASIC) which may be utilized in running and/or executing particular applications in the electronic device 200, such as an application processor, and the like. The disclosure, however, is not limited to any particular type of processors. When utilized as a general purpose processor, the processor 210 may be configured to, for example, process data, control or manage operations of the electronic device 200 (or components thereof), and/or execute or perform various programs, tasks and/or applications performed in the electronic device 200. For example, when controlling and/or managing the electronic device, the processor 210 may be utilized to configure and/or control operations of various components and/or subsystems of the electronic device 200, by utilizing, for example, one or more control signals.

The system memory 220 may comprise suitable circuitry for providing permanent and/or non-permanent storage, buffering, and/or fetching of data, code and/or other information, which may be used, consumed and/or processed in the electronic device 200. In this regard, the system memory 220 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage device. The system memory 220 may store, for example, configuration data, which may comprise parameters and/or code, comprising software and/or firmware.

The communication subsystem 230 may comprise suitable circuitry for supporting communication of data to and/or from the electronic device 200. For example, the communication subsystem 230 may comprise a signal processor 232, a RF front-end 234, and one or more antennas $236_1$-$236_N$.

The signal processor 232 may comprise suitable circuitry for processing signals transmitted and/or received by the electronic device 200, in accordance with one or more wired or wireless protocols supported by the electronic device 200. The signal processor 232 may be operable to perform such signal processing operation as filtering, amplification, up-conversion/down-conversion of baseband signals, analog-to-digital conversion and/or digital-to-analog conversion, modulation/demodulation, encoding/decoding, and/or encryption/decryption.

The RF front-end 234 may comprise suitable circuitry for handling RF transmission and/or reception, during wireless and/or wired communications, such as over a plurality of supported RF bands and/or carriers. The RF front-end 234 may be operable to handle, for example, wireless communications of RF signals via the antennas $236_1$-$236_N$. Each of the antennas $236_1$-$236_N$ may comprise suitable circuitry for facilitating over-the-air transmission and/or reception of wireless RF signals, which may be configured within certain bandwidths and/or in accordance with one or more wireless interfaces supported by the electronic device 200. The RF front-end 234 may also be operable to handle wired communications of RF signals, such as over a plurality of supported physical wired media. In this regard, the RF front-end 234 may support communications of RF signals via the plurality of wired connectors, within certain bandwidths and/or in accordance with one or more wired protocols (e.g. Ethernet) supported by the electronic device 200.

In operation, the electronic device 200 may be utilized for communication (transmission and/or reception) related operations. For example, the communication subsystem 230 may be utilized in setting up and/or utilizing connections that may be used in communication of data to and/or from the electronic device 200. The connections may comprise data connections (e.g., the communication channel 140), and/or control connections use in communication of control related messages or information (e.g., the control channel 150). These connections may be established using wired and/or wireless links (via the RF front-end 234). The signals transmitted and/or received over the setup connections may be processed via the signal processor 232.

In some instances, the electronic device 200 may support use of multiple carriers (or subcarrier) based communications. For example, the electronic device 200 may be configured to use OFDM based interfaces/protocols, and/or OFDM based communications. In this regard, the communication subsystem 230 may be operable to support configuring multiple subcarriers for OFDM based connections (e.g., configuring the RF front-end 234, as well as the wired connector and/or the antennas, to setup multiple subcarrier frequencies), and components thereof (e.g., the signal processor 232) may be configured to handle the necessary signal processing functions which OFDM communications may entail—e.g., encoding/decoding, modulation/demodulation, interleaving/de-interleaving, etc.

In some implementations, the electronic device 200 may be configured to support use of frequency spreading, during communications, particularly when using multiple carriers (or subcarriers) based communication—e.g., during OFDM based communication. In this regard, the electronic device 200 may be configured to provide transmit-end and/or receive-end based support to use of frequency spreading, including providing any necessary added manipulation (e.g., as part of signal processing). Configuring the electronic device 200 as transmit-side and/or receive-side for supporting frequency spreading/de-spreading is described in more detail with respect to the following figures.

Figure 3:
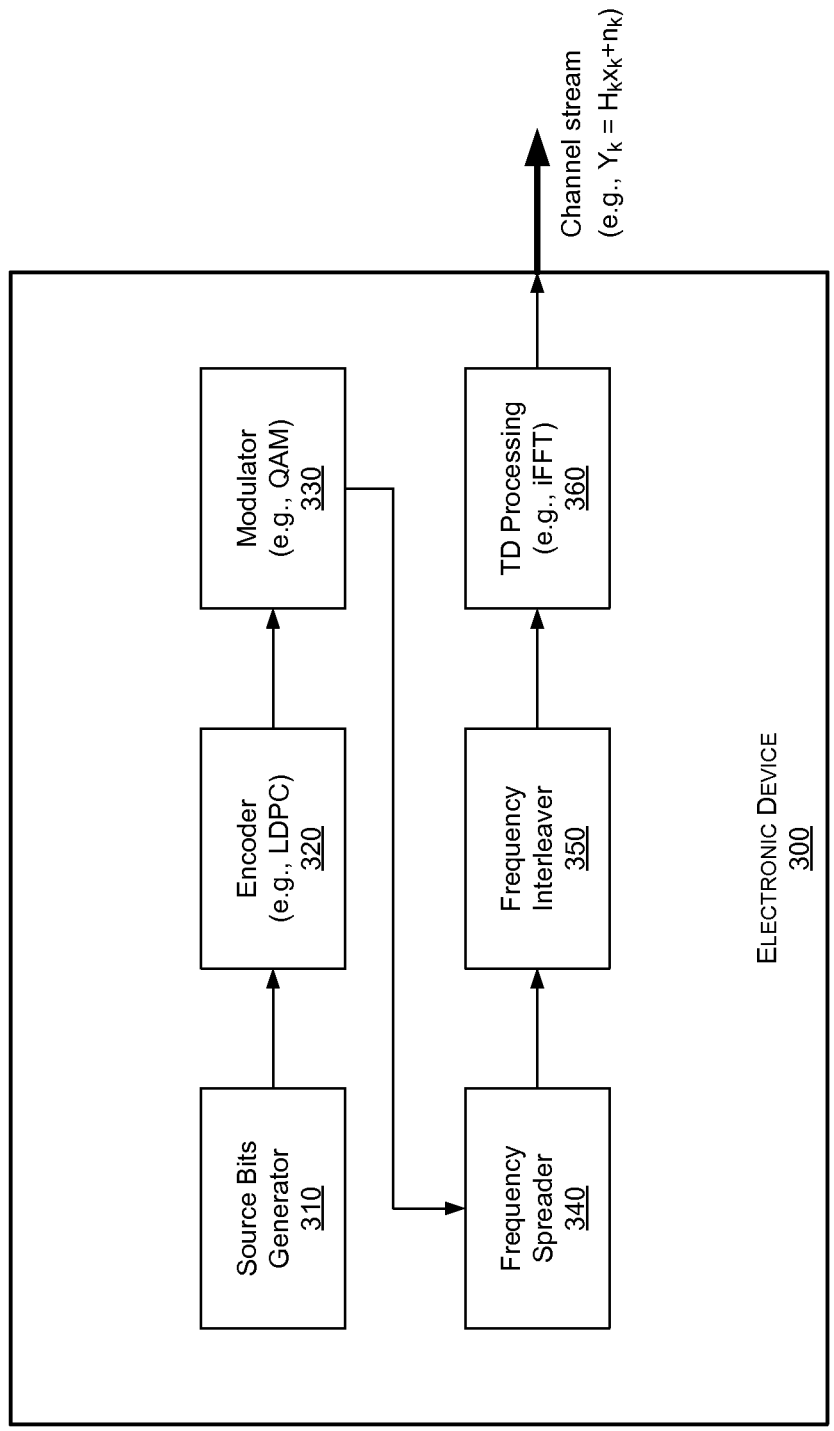
FIG. 3 illustrates an example electronic device configured for handling transmit-side use of frequency spreading for high-performance communications.

FIG. 3 illustrates an example electronic device configured for handling transmit-side use of frequency spreading for high-performance communications. Referring to FIG. 3, there is shown an electronic device 300.

The electronic device 300 may comprise suitable circuitry for implementing various aspects of the disclosure. The electronic device 300 may correspond to the electronic devices 200 of FIG. 2, such as when configured to handle 'transmit-side' operations, particularly when using frequency spreading for high-performance communications. In this regard, the electronic device 300 may comprise a plurality of functional blocks, configured for performing various operations in conjunction with transmission of data (e.g., to a peer, receive-end device). For example, as shown in FIG. 3, the electronic device 300 may comprise a source bit generator 310, an encoder 320, a modulator 330, a frequency spreader 340, a frequency interleaver 350, and a time-domain (TD) processing block 360. These functional blocks may be configured in and/or may correspond to components (or portion(s) thereof) of the electronic device 200, such as the processor 210, the signal processor 232, and/or the RF front-end 234.

The source bit generator 310 may comprise suitable circuitry for generating bits that would be transmitted from the electronic device 300. For example, the source bit generator 310 may correspond to the processor 210 (or portion(s) thereof) which may be used in generating data (e.g., based on user input or preconfigured instructions) for transmission.

The encoder 320 may comprise suitable circuitry for encoding bits (to be transmitted), based on one or more particular encoding scheme(s). For example, the encoder 320 may be configured to apply encoding based on low-density parity-check (LDPC) codes, which are particularly suitable for transmitting data over noisy transmission channels.

The modulator 330 may comprise suitable circuitry for performing modulation processing—that is incorporating of data (to-be-transmitted) onto carrier signals, by adjusting the carrier signals' waveforms (i.e., one or more properties thereof, such as amplitude, frequency, shift, etc.), in accordance with one or more particular modulation scheme(s). For example, the modulator 330 may be configured to perform quadrature amplitude modulation (QAM) based modulation.

The frequency spreader 340 may comprise suitable circuitry for performing frequency spreading, as described in more detail below. In particular, frequency spreading may allow spreading modulation symbols to further enhance performance.

The frequency interleaver 350 may comprise suitable circuitry for performing frequency interleaving—that is randomly (or in accordance with particular criteria) writing data (e.g., modulation symbols) onto one or more of available carriers (e.g., OFDM sub-carriers), to make transmission more resistant to effects of noisy channels (e.g., improve performance of forward error correcting codes).

The TD processing block 360 may comprise suitable circuitry for performing time domain processing—that is converting signals from frequency domain (as received over the channel) to time domain, for transmittal over communication channels. For example, the FD processing block 360 may be configured to apply inverse fast Fourier transform (iFFT).

In operation, the electronic device 300 may be operable to support use of frequency spreading during communications in which multiple carriers (or sub-carriers) are used (e.g., OFDM based communications). In particular, the electronic device 300 may provide transmit-side support for use of frequency spreading. For example, as shown in FIG. 3, the bits to be transmitted may be generated by the source bits generator 310 (e.g., the bits may correspond to output of application run in the electronic device 300, user input/ interactions when using web browser, etc.). The bits may then be encoded (e.g., LDPC encoded) via the encoder 320, and the encoded bits may then be subject to modulation processing, via the modulator 330, whereby they may be mapped to symbols (e.g., N-QAM symbols). The resultant symbols may then be input to the frequency spreader 340.

The frequency spreader 340 may then apply frequency spreading to the modulation symbols. In this regard, frequency spreading may comprise grouping data input (i.e. mapping/modulation symbols) into groups of a certain size—i.e. each group has a particular number of the input symbols. The size of a group may be determined based on first spreading factor, which may be set based on number of subcarrier for example. The disclosure is not so limited, however, and other criteria may be used in determining the first spreading factor (i.e., setting the number of input symbols in each group). Each group may then be multiplied by a particular spreading matrix, which may be selected adaptively to provide spreading that meets particular criteria. The criteria used in configuring and/or setting the spreading matrix may be based on power, channel noise, desired performance (e.g., correctness vs. throughput), etc. The spreading matrix may be configured or selected, for example, such that power may be evenly distributed among the subcarriers. The spreading matrix may be a square matrix—i.e. having the same number of rows and columns (e.g., set based on the number of subcarriers). Nonetheless, the disclosure is not so limited, and non-square matrices may be used as well. The spreading matrix may be pre-programmed into the electronic device 300, and remains unchanged thereafter. Alternatively, the spreading matrix may be dynamically selected (e.g., from a local or remote database) when frequency spreading is activated or enabled; or may be dynamically configured (e.g., based on characteristics of the communication, such as number of subcarriers, used frequencies, etc.).

For example, with reference to the example shown in FIG. 3, in which N-QAM modulation is used (i.e., bits may be mapped to one of N symbols, corresponding to N subcarriers), the frequency spreader 340 may group the QAM symbols input into it into groups of N symbols. Each group of N symbols (referred to hereinafter as X) may then be multiplied by N×N spreading matrix, which satisfies $S^T S = I$ (where I is the N×N identity matrix). An example spreading matrix for N=4 may be:

$$\begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

The result of multiplication is thus SX, which may be an N-element vector. The elements of the N-element vector SX may then be assigned, respectively, to N subcarriers.

The output of the frequency spreader 340 may be a plurality of modulated subcarriers (e.g., corresponding to the N-QAM subcarriers). The output of the frequency spreader 340 (that is, the plurality of modulated subcarriers) may be input to the frequency interleaver 350, which may interleave the spreading symbols onto subcarriers used for transmissions from the electronic device 300. The output of the frequency interleaver 350 is then subject to inverse fast Fourier transform (iFFT), via the TD processing block 360, to convert frequency-domain signals to time-domain signal, which may then be transmitted onto the communication channel. For example, the signal transmitted onto the channel may be $Y_k = H_k x_k + n_k$, where $H_k$ is the diagonal channel matrix and $n_k$ is noise introduced by the channel. Further, the actual communicated data, $x_k$, may then be SX (the spreading symbols)—thus, the transmitted signal may become $Y_k = H_k SX + n_k$. The handling of communication at the receive-end is described in detail with respect to FIG. 4.

Figure 4:
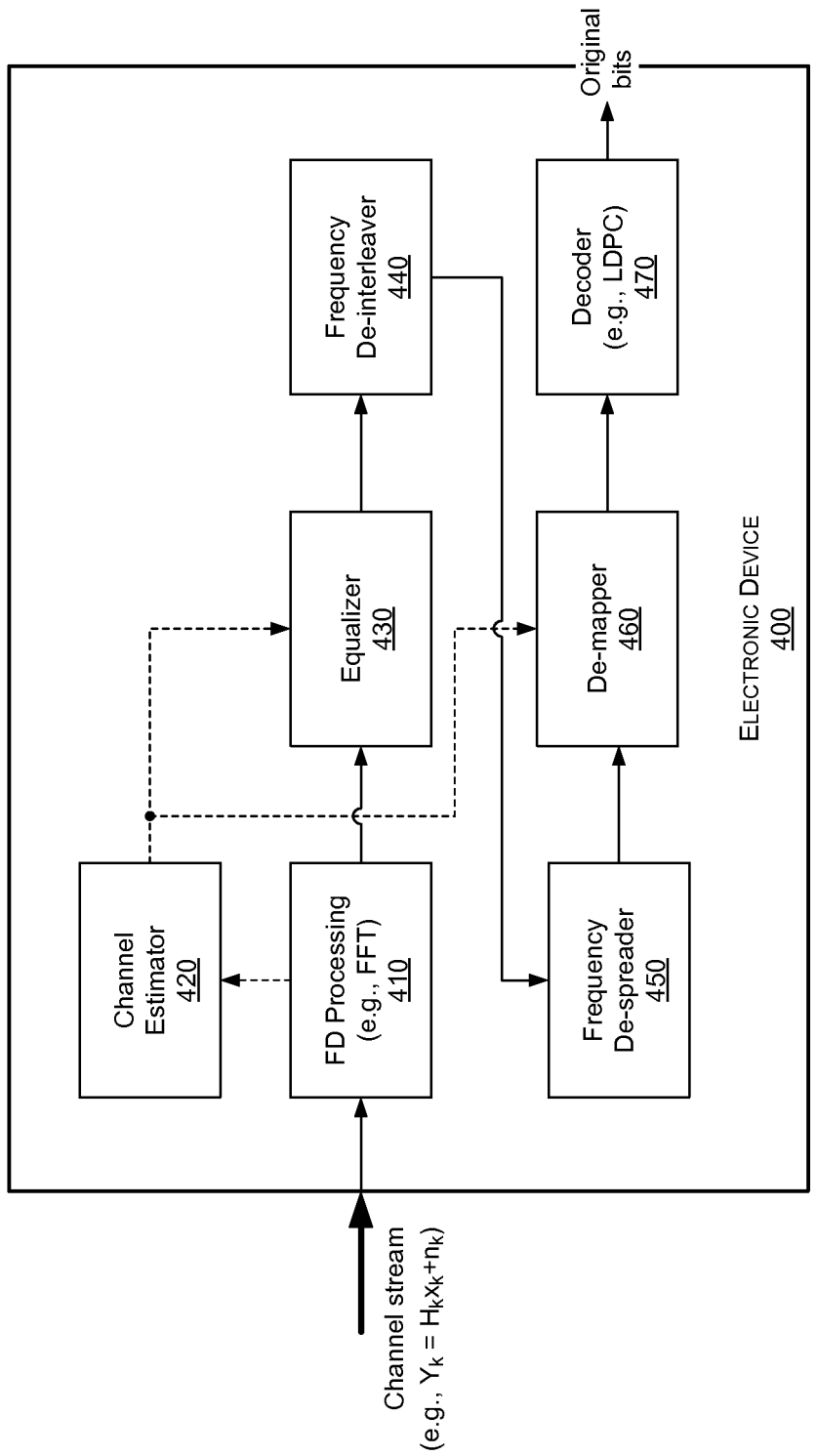
FIG. 4 illustrates an example electronic device configured for handling receive-side use of frequency spreading for high-performance communications.

FIG. 4 illustrates an example electronic device configured for handling receive-side use of frequency spreading for high-performance communications. Referring to FIG. 4, there is shown an electronic device 400.

The electronic device 400 may comprise suitable circuitry for implementing various aspects of the disclosure. The electronic device 400 may correspond to the electronic devices 200 of FIG. 2, such as when configured to handle 'receive-side' operations, particularly when using frequency spreading for high-performance communications. In this regard, the electronic device 400 may comprise a plurality of functional blocks, configured for performing various operations in conjunction with transmission of data (e.g., to a peer, receive-end device). For example, as shown in FIG. 4, the electronic device 400 may comprise a frequency domain (FD) processing block 410, a channel estimator 420, an equalizer 430, a frequency de-interleaver 440, a frequency de-spreader 450, a demapper 460, and a decoder 470. These functional blocks may be configured in and/or may correspond to components (or portion(s) thereof) of the electronic device 200, such as the processor 210, the signal processor 232, and/or the RF front-end 234.

The FD processing block 410 may comprise suitable circuitry for performing frequency domain processing—that is converting signals from time domain (as received over the channel) to frequency domain (to enable frequency domain based processing of the signals). For example, the FD processing block 410 may be configured to apply fast Fourier transform (FFT).

The channel estimator 420 may comprise suitable circuitry for performing channel estimation, which may be used to control and/or adjust processing of signals received over the channels for which channel estimation is done. In this regard, channel estimation may be needed, particularly in multi-carrier communications (e.g., OFDM based communications), to enable proper handling of received signals at the transmit-side—e.g., to enable proper de-modulation of OFDM signals. For example, the channel estimator 420 may be channel estimator is operable to determine response of the channel, which may be used in compensating for and/or calibrating out distortion introduced by the channel. Various methods may be used for channel estimation (e.g., using pilot tones, which may be inserted into all of the subcarriers).

The source bit generator 410 may comprise suitable circuitry for generating bits that would be transmitted from the electronic device 400. For example, the source bit generator 410 may correspond to the processor 210 (or portion(s) thereof) which may be used in generating data (e.g., based on user input or preconfigured instructions) for transmission.

The frequency de-interleaver 440 may comprise suitable circuitry for performing frequency de-interleaving—that is re-ordering of bits in received signals, to undo the re-ordering performed in at transmit-side when the bits were interleaved onto the carriers (e.g., the OFDM sub-carriers).

The frequency de-spreader 450 may comprise suitable circuitry for performing frequency de-spreading, as described in more detail below. In particular, frequency de-spreading may allow recovering of original data (e.g., modulation symbols) from spreading data (e.g., spreading symbols), to undo frequency spreading performed at transmit-side.

The demapper 460 may comprise suitable circuitry for performing demapping processing—e.g., demapping of each of the modulation symbols in received signals to one or more binary values, corresponding to original data as it existed prior to application of modulation at the transmit-side, and outputting the binary values. For example, the demapper 460 may be configured to perform demapping necessary to undo quadrature amplitude modulation (QAM) modulation done at the transmit-side.

The decoder 470 may comprise suitable circuitry for decoding data (e.g., data received during communications), based on particular encoding/decoding protocols. For example, the decoder 470 may be configured to apply decoding based on LDPC encoding/codes.

In operation, the electronic device 400 may be operable to support use of frequency spreading during communications in which multiple carriers (or sub-carriers) are used (e.g., OFDM based communications). In particular, the electronic device 400 may provide receive-side support for use of frequency spreading. For example, as shown in FIG. 4, the electronic device 400 may receive communications transmitted over a communication channel, comprising frequency spread content (as described with respect to FIG. 3). The received content may initially be subject to fast Fourier transform (FFT), via the FD processing block 410, to convert time-domain signals (as obtained from the communication channel) into corresponding frequency-domain signals, from which data carried in signals communicated over the communication channel may be extracted, using frequency domain based processing. The output of the FD processing block 410 may then be subject to equalization (e.g., zero forcing equalization) by the equalizer 430. The output of the FD processing block 410 may also be provided to the channel estimator 420, which may perform channel estimation of the communication channel that is used by the electronic device 400 (for receiving the signals). In this regard, the output of the channel estimator 420 may be provided to other processing blocks (e.g., the equalizer 430 and/or the demapper 460), such as for use in controlling and/or adjusting functions performed therein. The output of the equalizer 420 may then be passed to the frequency de-interleaver 440, which may de-interleave data (e.g., spreading symbols) from the sub-carriers. The output of the frequency de-interleaver 440 may then be input to a frequency de-spreader 450. The frequency de-spreader 450 may then apply frequency de-spreading to the data extracted from the de-interleaving (e.g., the spreading symbols), to extract original, pre-spreading data—i.e., data that was subjected to the frequency spreading at the transmit-side (e.g., originally generated modulation symbols). Thus, the frequency de-spreading performed in the frequency de-spreader 450 may be particularly configured to undo the frequency spreading that was done at the transmit-side. For example, the frequency de-spreader 450 may utilize the same spreading matrix that was used at the transmit-side, to re-generate the original groups that were selected at the transmit-side—e.g., by applying the spreading matrix to the extracted spreading symbols, which correspond to the output of applying the same matrix at the transmit-side to generate the same spreading symbols. Accordingly, the transmit-side and receive-side devices may communicate with one another, to exchange control information (e.g., using a control channel, such as the channel 150) relating to frequency spreading/de-spreading. Examples of exchanged control information may comprise indicators of when to enable/disable (or activate/deactivate) frequency spreading, and/or frequency related data, such as the spreading matrix (or information that may be used in obtaining or configuring the matrix).

For example, with reference to the example shown in FIG. 4, in which the signal transmitted over the communication channel by the transmit-side may be expressed (based on use of the spreading matrix S at the transmit-side, as described with respect to FIG. 3) as: $Y_k = H_k SX + n_k$ based on use of the spreading matrix S at the transmit-side (as described with respect to FIG. 3), the expression for the received signal may be rearranged (to account for the signal reception) as: expression $H_k^{-1} Y_k = SX + H_k^{-1} n_k$. Thus, the frequency de-spreader 450 may be configured to multiply the output of the frequency de-interleaver 440 by the transpose of the spreading matrix ($S^T$), which may yield $Z = S^T H_k^{-1} Y_k = X + S^T H_k^{-1} n_k$. Accordingly, the original groups (X), corresponding to grouping of the original (i.e., transmit-side) mapping/modulation symbols for example, may be extracted as a result of the frequency de-spreading applied in the frequency de-spreader 450. The output of the frequency de-spreader 450 may then be input to the demapper 460, which may de-map the modulation symbols to extract the original encoded bit. The de-mapped encoded bits may then be decoded (e.g., LDPC decoded) via the decoder 470, to obtain the original bits (i.e., the bits generated by the source bits generator 310 of the electronic device 300).

In some example implementations, the frequency spreading input (e.g., symbols output by the QAM modulator) may be scrambled (e.g., pseudo-randomly), at the input of the frequency spreader, to further enhance performance (e.g., enhance diversity). In some example implementations, assigning output of the frequency spreading to the subcarriers may be done in an adaptive manner—e.g., channel state information may be used to select which subcarriers to which the output of the frequency spreader are assigned. In some example implementations, frequency spreading may be selectively enabled or disabled based on one or more criterion or condition. For example, frequency spreading may be enabled when a relatively weak error correction coding scheme is used and may be disabled when a relatively strong error correction coding scheme is used.

Figure 5:
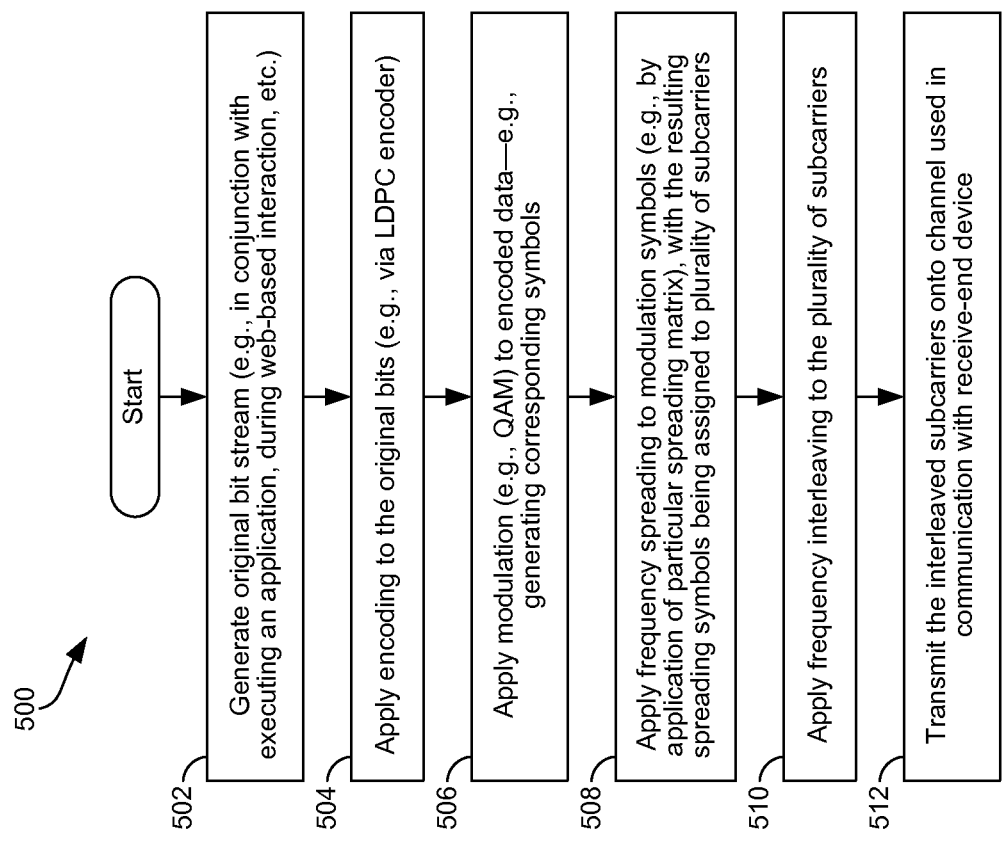
FIG. 5 is a flowchart illustrating an example process for providing transmit-side handling of frequency spreading for high-performance communications.

FIG. 5 is a flowchart illustrating an example process for providing transmit-side handling of frequency spreading for high-performance communications. Referring to FIG. 5, there is shown a flow chart 500, comprising a plurality of example steps, which may be executed in a system (e.g., the electronic device 300 of FIG. 3) that may be used in providing transmit-side handling of frequency spreading for high-performance communications.

In step 502, an original bit stream may be generated (e.g., in conjunction with executing an application, during web-based interaction, etc.). In step 504, encoding (e.g., LDPC encoding) may be applied to the original bits. In step 506, modulation (e.g., QAM) may be applied to encoded data, thus resulting in generation of corresponding symbols.

In step 508, frequency spreading may be applied—e.g., to the modulation symbols, such as by grouping the symbols and multiplying each group with the spreading matrix). The resulting spreading symbols may then be assigned to a plurality of subcarriers.

In this regard, in step 510, frequency interleaving may be applied to spreading symbols when assigning them to the plurality of subcarriers. In step 512, the interleaved signal may be communicated via the subcarriers onto a channel used in communication with receive-end device.

Figure 6:
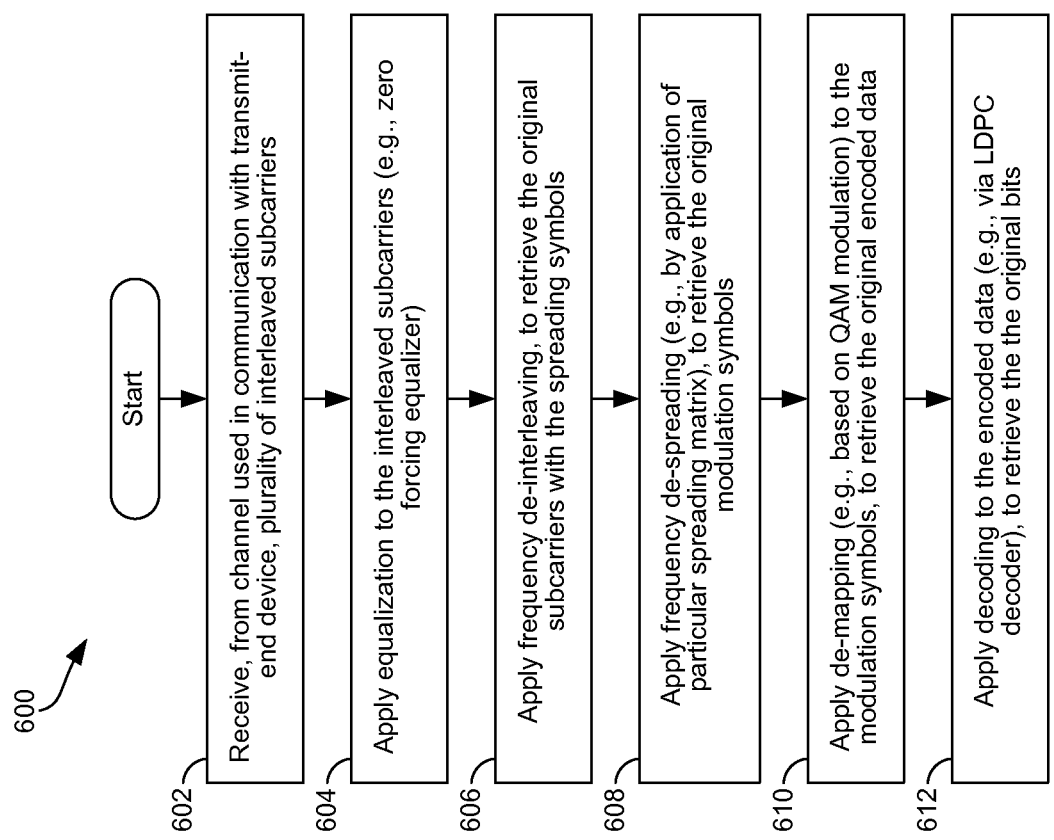
FIG. 6 is a flowchart illustrating an example process for providing receive-side handling of frequency spreading for high-performance communications.

FIG. 6 is a flowchart illustrating an example process for providing receive-side handling of frequency spreading for high-performance communications. Referring to FIG. 6, there is shown a flow chart 600, comprising a plurality of example steps, which may be executed in a system (e.g., the electronic device 400 of FIG. 4) that may be used in providing receive-side handling of frequency spreading for high-performance communications.

In step 602, a signal may be received by the receive-end device, from a channel used in communication with transmit-end device. The signal may comprise a plurality of interleaved subcarriers. In step 604, equalization (e.g., zero forcing equalization) may be applied to the received signal (the interleaved subcarriers). In step 606, frequency de-interleaving may be applied, to retrieve the original subcarriers with the spreading symbols.

In step 608, frequency de-spreading may be applied, to retrieve the original modulation symbols (e.g., by application of the spreading matrix used at the transmit-side). In step 610, de-mapping may applied (e.g., based on QAM), to the modulation symbols, to retrieve the original data (which may be encoded data). In step 612, decoding (e.g., LDPC based encoding) may be applied to the encoded data, to retrieve the original bits.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancelation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
in a first electronic device:
configuring a spreading matrix based on information associated with communications between the first electronic device and a second electronic device;
configuring the spreading matrix for distributing power evenly among a plurality of subcarriers; and
applying frequency spreading to transmit data during transmission to the second electronic device, wherein:
the transmission comprises use of the plurality of subcarriers;
the frequency spreading comprises generating a plurality of spreading data vectors based on the transmit data;
each spreading data vector is generated by applying the spreading matrix to a portion of the transmit data, wherein the transmit data comprises a sequence of symbols generated by mapping two or more data bits to one of N symbols, wherein N corresponds to the number of subcarriers in the plurality of subcarriers, and wherein the portion of the transmit data comprises N symbols; and
each spreading data vector comprises a plurality of elements, for assignment to the plurality of subcarriers, for transmission to the second electronic device.

2. The method of claim 1, comprising assigning the plurality of spreading data vectors by interleaving onto the plurality of the subcarriers.

3. The method of claim 1, comprising setting a size of the portion of the transmit data to which the spreading matrix is applied based on number of the plurality of subcarriers.

4. The method of claim 1, comprising setting a number of the plurality of elements in each spreading data vector based on a number of the plurality of subcarriers.

5. The method of claim 1, wherein the sequence of symbols is generated by application of a modulation scheme.

6. The method of claim 5, comprising applying the modulation scheme to a sequence of input data, to generate the sequence of symbols.

7. The method of claim 6, comprising generating the sequence of input data based on an encoding of an original bit stream.

8. The method of claim 1, comprising applying in the second electronic device, frequency de-spreading to signals received from the first electronic device, to extract the transmit data.

9. The method of claim 8, comprising generating in the second electronic device the transmit data from the received signal by:
extracting the plurality of spreading data vectors from the received signals; and
applying the spreading matrix to each one of the extracted plurality of spreading data vectors, to regenerate a portion of the transmit data corresponding to the one of the extracted plurality of spreading data vectors.

10. The method of claim 8, comprising applying in the second electronic device, de-mapping to the transmit data, to enable obtaining a copy of an original input in the first electronic device.

11. The method of claim 1, comprising selectively enabling the frequency spreading based on one or more criteria or conditions.

12. The method of claim 1, comprising adaptively adjusting the spreading matrix based on channel related information received from the second electronic device.

13. A system, comprising:
an electronic device that comprises:
at least one communication circuit operable to handle transmission of signals to a second electronic device; and
at least one processing circuit operable to:
configure a spreading matrix based on information associated with communications between the first electronic device and a second electronic device; and
apply frequency spreading to transmit data during transmission of signal to the second electronic device,
wherein:
the transmission comprises use of a plurality of subcarriers, the spreading matrix being configured for distributing power among the plurality of subcarriers;
the frequency spreading comprises generating a plurality of spreading data vectors based on the transmit data;
each spreading data vector is generated by applying the spreading matrix to a portion of the transmit data, wherein the transmit data comprises a sequence of symbols generated by mapping two or more data bits to one of N symbols, wherein N corresponds to the number of subcarriers in the plurality of subcarriers, and wherein the portion of the transmit data comprises N symbols; and
each spreading data vector comprises a plurality of elements, for assignment to the plurality of subcarriers, for transmission to the second electronic device.

14. The system of claim 13, wherein the at least one processing circuit is operable to assign the plurality of spreading data vectors by interleaving onto the plurality of the subcarriers.

15. The system of claim 13, wherein the at least one processing circuit is operable to set a size of the portion of the transmit data to which the spreading matrix is applied based on number of the plurality of subcarriers.

16. The system of claim 13, wherein the at least one processing circuit is operable to set a number of the plurality of elements in each spreading data vector based on a number of the plurality of subcarriers.

17. The system of claim 13, wherein the at least one processing circuit is operable to generate the sequence of symbols by application of a modulation scheme.

18. The system of claim 17, wherein the at least one processing circuit is operable to apply the modulation scheme to a sequence of input data, to generate the sequence of symbols.

19. The system of claim 18, wherein the at least one processing circuit is operable to generate the sequence of input data based on an encoding of an original bit stream.

20. The system of claim 13, wherein the at least one processing circuit is operable to selectively enable the frequency spreading based on one or more criteria or conditions.

21. The system of claim 13, wherein the at least one processing circuit is operable to adaptively adjust the spreading matrix based on channel related information received from the second electronic device.

22. A system, comprising:
an electronic device that comprises:
at least one communication circuit operable to receive a signal received from a second electronic device, wherein the signal is communicated using a plurality of subcarriers; and
at least one processing circuit operable to:
process the received signal to extract receive data corresponding to a plurality of spreading data vectors; and
apply frequency de-spreading to the receive data, wherein:
the frequency de-spreading comprises applying a spreading matrix to each one of the plurality of spreading data vectors, to regenerate a portion of an original transmit data, wherein the spreading matrix is configured to distribute power among the plurality of subcarriers;
the original transmit data comprises a sequence of symbols, and the frequency de-spreading is configured to account for mapping of more than one bit to at least one symbol in the portion of an original transmit data; and
the spreading matrix is configured based on information associated with communications between the electronic device and the second electronic device.

23. The system of claim 22, wherein the at least one processing circuit is operable to apply demapping, to extract an original input data from the sequence of symbols.

24. The system of claim 23, wherein the at least one processing circuit is operable to apply decoding to the extract original input data, to regenerate an original input bit stream.

25. The system of claim 22, wherein processing the received signal comprises:
generating channel related information based on channel estimation; and
applying one or more adjustments during the processing based on the channel related information.

26. The system of claim 22, wherein the frequency spreading is selectively enabled based on one or more criteria or conditions.

* * * * *